US007941565B2

(12) United States Patent
Vail

(10) Patent No.: US 7,941,565 B2
(45) Date of Patent: May 10, 2011

(54) NETWORK INTERFACE DEVICE

(75) Inventor: Johnathan Owen Vail, Nashua, NH (US)

(73) Assignee: Entegris, Inc., Billerica, MA (US)

( * ) Notice: Subject to any disclaimer, the term of this patent is extended or adjusted under 35 U.S.C. 154(b) by 363 days.

(21) Appl. No.: 12/114,414

(22) Filed: May 2, 2008

(65) Prior Publication Data

US 2008/0275853 A1 Nov. 6, 2008

Related U.S. Application Data

(60) Provisional application No. 60/927,644, filed on May 4, 2007.

(51) Int. Cl.
*G06F 15/16* (2006.01)
*G06F 12/00* (2006.01)

(52) U.S. Cl. ...................................................... 709/250

(58) Field of Classification Search .......... 709/201–203, 709/206, 217–219, 224, 225–229, 230–231, 709/249, 250; 700/1–3, 275, 282; 707/10
See application file for complete search history.

(56) References Cited

U.S. PATENT DOCUMENTS

| | | | |
|---|---|---|---|
| 6,961,753 B1 * | 11/2005 | Osburn, III | 709/203 |
| 7,272,530 B2 * | 9/2007 | Hsiung et al. | 702/182 |
| 7,415,368 B2 * | 8/2008 | Gilbert et al. | 702/61 |
| 2002/0152298 A1 | 10/2002 | Kikta et al. | |
| 2003/0204756 A1 * | 10/2003 | Ransom et al. | 713/300 |
| 2004/0260404 A1 * | 12/2004 | Russell et al. | 700/1 |
| 2005/0119914 A1 | 6/2005 | Batch | |
| 2006/0018283 A1 | 1/2006 | Lewis et al. | |

OTHER PUBLICATIONS

International Search Report and Written Opinion mailed Jul. 14, 2008 for PCT/US2008/062369.

* cited by examiner

*Primary Examiner* — Zarni Maung
(74) *Attorney, Agent, or Firm* — Sprinkle IP Law Group

(57) ABSTRACT

A network interface device in a manufacturing system may receive communications from remote users in a database query language. The network interface device may translate or forward commands and queries in a pump-supported language. The network interface device may communicate the commands and queries to pumps and other components on the manufacturing process using the pump-supported language. The results of the command or query may be returned to the network interface device, which may send the information to a database. A GUI allows the remote user to check states of pumps or other functions.

13 Claims, 8 Drawing Sheets

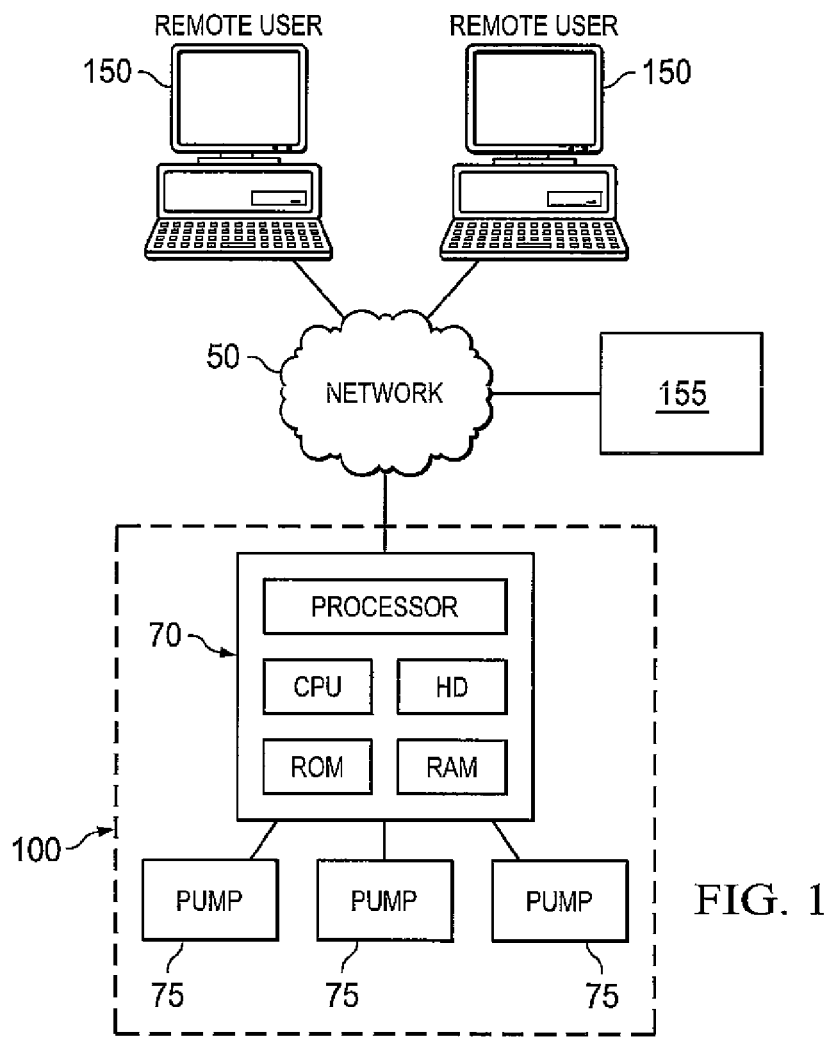
FIG. 1
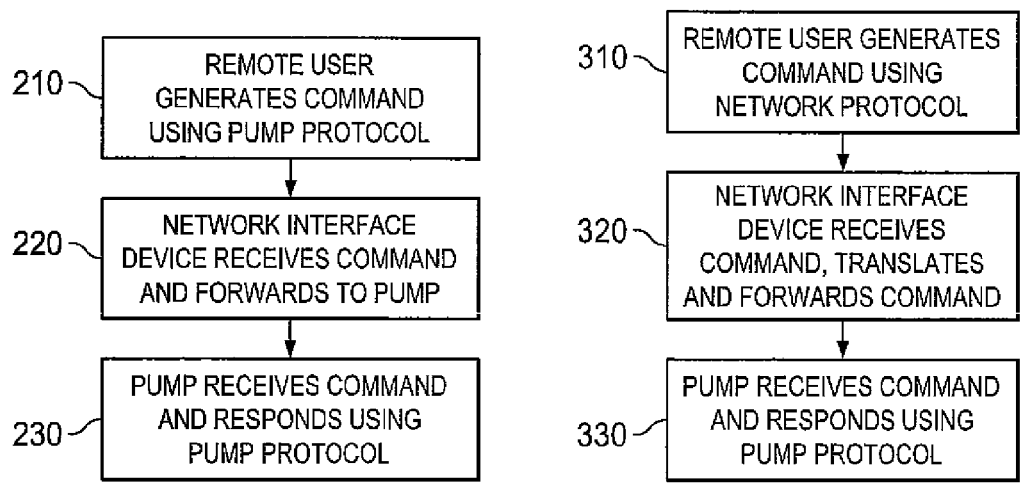
FIG. 2
FIG. 3

```xml
<?xml version="1.0" encoding="UTF-8" ?>
- <poll>
- <globals>
  <logfile>/var/log/pypoller.log</logfile>
  <loglevel>DEBUG</loglevel>
  <hostname>localhost</hostname>
  <port>8888</port>
  <delay>1</delay>
  <dateformat>%Y-%m-%d</dateformat>
  </globals>
- <database name="db_database" type="odbc">
  <environment>ORACLE_HOME=/usr/lib/oracle/xe/app/oracle/product/10.2.0/client,TWO_TASK=XE </environment>
  <driver>{Oracle 10g ODBC driver}</driver>    <hostname>(DESCRIPTION=(ADDRESS=(PROTOCOL=TCP)(HOST=wolverine)
       (PORT=1521))(CONNECT_DATA=(SERVER=DEDICATED)(SERVICE_NAME=XE))) </hostname>
  <user>********</user>
  <password>********</password>
  <database>XE</database>
  </database>
- <fields>
  <field name="Pump Name" command="SP" fieldname="Name" dbname="PumpName" />
  <field name="Address" command="SP" fieldname="Address" dbname="PumpAddress" />
  <field name="Cycle" command="INTERNAL" fieldname="Cycle" dbname="CycleNumber" />
  <field name="timestamp" command="INTERNAL" fieldname="Timestamp" dbname="TIMESTAMP" />
  <field name="Event Type" command="INTERNAL" fieldname="Type" dbname="EVENT_TYPE" />
  <field name="RSQ" command="RECIPE" fieldname="RSQValue" dbname="RSQ" />
  <field name="Version" command="VERSION" fieldname="Version" dbname="Version" />
  </fields>
- <profile>
  <trace_bits>1</trace_bits>
  <sample_interval>20</sample_interval>
  <send_settings>False</send_settings>
  <field name="Pump Name" />
  <field name="Address" />
  <field name="Cycle" />
  <field name="timestamp" />
  <field name="Event Type" />
  </profile>
- <trigger name="cycle_trigger">
- <profile type="csv">
  <filename>/tmp/press_prof-$Date-$CycleNumber.csv </filename>
  </profile>
- <output type="database">
  <table>all-dispense</table>
  </output>
  <field name="Pump Name" />
  <field name="Address" />
  <field name="Cycle" />
  <field name="Timestamp" />
  <field name="Event Type" />
  <field name="RSQ" />
  </trigger>
- <event_triggers>
  <exclude>1121</exclude>
  <exclude>1122</exclude>
  <exclude>1123</exclude>
  <exclude>1124</exclude>
  <exclude>1125</exclude>
  <exclude>1126</exclude>
  <exclude>1127</exclude>
  <exclude>1128</exclude>
```

FROM FIG. 12A

```xml
- <trigger name="error">
- <output type="csv">
    <filename>/tmp/errors-$Date-$CycleNumber.csv</filename>
  </output>
  <field name="Pump Name" />
  <field name="Address" />
  <field name="Cycle" />
  <field name="Timestamp" />
  <field name="Event Type" />
  <field name="RSQ" />
  </trigger>
- <trigger name="warn">
- <output type="csv">
    <filename>/tmp/log-$Date-$CycleNumber.csv</filename>
  </output>
  <field name="Pump Name" />
  <field name="Address" />
  <field name="Cycle" />
  <field name="Timestamp" />
  <field name="Event Type" />
  <field name="RSQ" />
  </trigger>
- <trigger name="info">
- <output type="csv">
    <filename>/tmp/log-$Date-$CycleNumber.csv</filename>
  </output>
  <field name="Pump Name" />
  <field name="Address" />
  <field name="Cycle" />
  <field name="Timestamp" />
  <field name="Event Type" />
  <field name="RSQ" />
  </trigger>
- <trigger name="special">
    <include>1001</include>
- <output type="csv">
    <filename>/tmp/log-$Date-$CycleNumber.csv</filename>
  </output>
  <field name="Pump Name" />
  <field name="Address" />
  <field name="Cycle" />
  <field name="Timestamp" />
  <field name="Event Type" />
  <field name="Version" />
  </trigger>
  </event_triggers>
- <interface number="1" enabled="True">
    <pump address="1" enabled="True" />
    <pump address="2" enabled="False" />
  </interface>
- <interface number="2" enabled="False">
    <pump address="1" enabled="True" />
  </interface>
  </poll>
```

NETWORK INTERFACE DEVICE

RELATED APPLICATIONS

This application claims priority from U.S. Provisional Patent Application No. 60/927,644, filed May 4, 2007, entitled "INTELLIGEN MINI NETWORK INTERFACE," the entire contents of which are expressly incorporated herein by reference for all purposes.

COPYRIGHT NOTICE

A portion of the disclosure of this patent document, appendices included, contains materials to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

FIELD OF THE DISCLOSURE

The present invention relates generally to interface devices and more particularly to a network interface device interfacing fluid components to a computer network and capable of responding to queries according to a database query language.

BACKGROUND OF THE DISCLOSURE

As the semiconductor manufacturing technology evolves, the sophistication of systems monitoring the operation and performance of pumps has also amplified. Increasingly, pump customers, such as semiconductor manufacturers, desire to integrate the ability to obtain detailed information from a pump or pump system into their factory automation (FA) system. In existing approaches, such integration is a manual and often tedious process as each customer's factory automation system often runs PC-based man-machine interface (MMI) software or custom software running on a PC platform to monitor the pump. Thus, a factory pump interface device would be modified with custom software particularly written to run on a customer's factory automation system. Such custom solutions can be expensive, inefficient, and time consuming.

SUMMARY

In one embodiment, the network interface device is a computer appliance device. In one embodiment, the network interface device provides unattended monitoring and reporting of fluid components connected thereto, requiring no special computers and/or software. In one embodiment, the network interface device is a standalone device running on a SQL platform. As most factory automation systems utilize database servers to process and store information, using a database language enables the network interface device to interact with database servers and respond to database queries without custom or specialized customer software. In this way, specialized information about components can be accessed and obtained in a generic way.

In one embodiment, the network interface device is a piece of hardware coded with software instructions translatable to perform a plurality of functions particular to a fluid control system and to communicate in a query language. In one embodiment, the query language can be used to create, modify and retrieve data from relational database management systems. In one embodiment, the query language is Structured Query Language (SQL). In one embodiment, the network interface device uses SQL with appropriate network software to provide a simple and consistent interface to almost any customer database or factory automation system.

Some embodiments disclosed herein may be directed to a network interface device comprising communication ports, a computer network communication port, a non-volatile computer memory for storing a set of computer-executable instructions and a processor for executing the set of computer-executable instructions. The set of computer-executable instructions may be operable to communicate with one or more pumps coupled to the network interface device via the one or more pump communication ports and communicate with a database server coupled to the network interface device via a computer network communication port. In some embodiments, interacting with the one or more pump controllers includes obtaining information about one or more pumps coupled to the one or more pump controllers. In some embodiments, interacting with the database server includes responding to queries from the database server. In some embodiments, the one or more pump communication ports comprise at least one serial port. In some embodiments, a computer network communication port comprises an Ethernet port. In some embodiments, the system includes a wireless network interface. In some embodiments, the set of instructions is further operable to provide remote man-machine interface (MMI) access to the one or more pump controllers. In some embodiments, the remote MMI access is obtainable via a Web browser application running on a client machine coupled to the network interface device via a computer network communication port. In some embodiments, the information about the one or more pumps includes one or more of cycle number, device identifier, time stamp, recipe number, recipe volume, dispense confirmation score, dispense profile, or a combination thereof. In some embodiments, the set of computer-executable instructions is operable to communicate with pumps to configure the pumps. In some embodiments, the set of computer-executable instructions is operable to push the information about a pump to a database server. In some embodiments, the set of instructions is further operable to provide an alarm, an error message, a notification, or a combination thereof to a user device communicatively coupled to the network interface device. In some embodiments, the database server is a part of a factory automation system and the set of instructions is further operable to provide an alarm, an error message, a notification, or a combination thereof to the factory automation system. In some embodiments, the set of computer-executable instructions is operable to interact with databases in Structured Query Language (SQL). In some embodiments, the set of computer-executable instructions is operable to support HyperText Transfer Protocol (HTTP) and Dynamic Host Configuration Protocol (DHCP).

Some embodiments disclosed herein may be directed to a network interface device having communication ports for communicating with one or more pumps, at least one network communications port, a non-volatile computer memory for storing a set of computer-executable instructions and a processor for executing the set of computer-executable instructions. The set of computer-executable instructions may be operable to communicate with one or more pump controllers communicatively coupled to the one or more pumps and communicate with a computer device accessed by a remote user. In some embodiments, communicating with the computer device includes communicating the information about the one or more pumps to the computer device. In some embodiments, communicating with the one or more pump controllers includes obtaining information about the one or more pumps.

Some embodiments disclosed herein may be directed to a method including receiving a command from a remote computing device according to a first transport protocol, forwarding the command to one or more pump controllers according to a second transport protocol, communicating with one or more pump controllers using a command protocol supported by the one or more pump controllers and communicating with a database server coupled to the network interface device. In some embodiments, interacting with the one or more pump controllers includes obtaining information about one or more pumps coupled to the one or more pump controllers. In some embodiments, interacting with the database server includes forwarding information received from the one or more pump controllers to the database server according to a query language supported by the database server. In some embodiments, the method further comprises translating the command received from the remote computing device according to the first protocol to the second command protocol supported by the one or more pumps. In some embodiments, the method further comprises sending an alarm, an error message, a notification, or a combination thereof to the remote computer device. In some embodiments, the query language comprises Structured Query Language (SQL).

In some embodiments, the set of computer-executable instructions is operable to communicate with a computer device via a wireless network interface. In some embodiments, the set of computer-executable instructions is operable to provide an alarm, an error message, a notification, or a combination thereof to the computer device.

In some embodiments, the set of computer-executable instructions is operable to communicate with databases using a query language. Embodiments disclosed herein can provide many advantages. For example, the network interface device can provide remote access to pumps for setup and configuration, eliminating or reducing the need/cost to do so on-site. As another example, the network interface device can provide unattended data collection and presentation to customer factory automation databases, eliminating or reducing the need/cost to do so manually. As yet another example, the network interface device can provide easier diagnosis and visibility of pump features, which is useful in retrofitting applications.

BRIEF DESCRIPTION OF THE DRAWINGS

FIG. 1 is a diagrammatic representation of a system having a network interface device;

FIG. 2 is a flow chart of an embodiment of a method for providing a network interface;

FIG. 3 is a flow chart of an embodiment of a method for providing a network interface;

FIG. 12 depicts a file having code for forwarding data to a database server using a database language.

DETAILED DESCRIPTION

Figure 4:
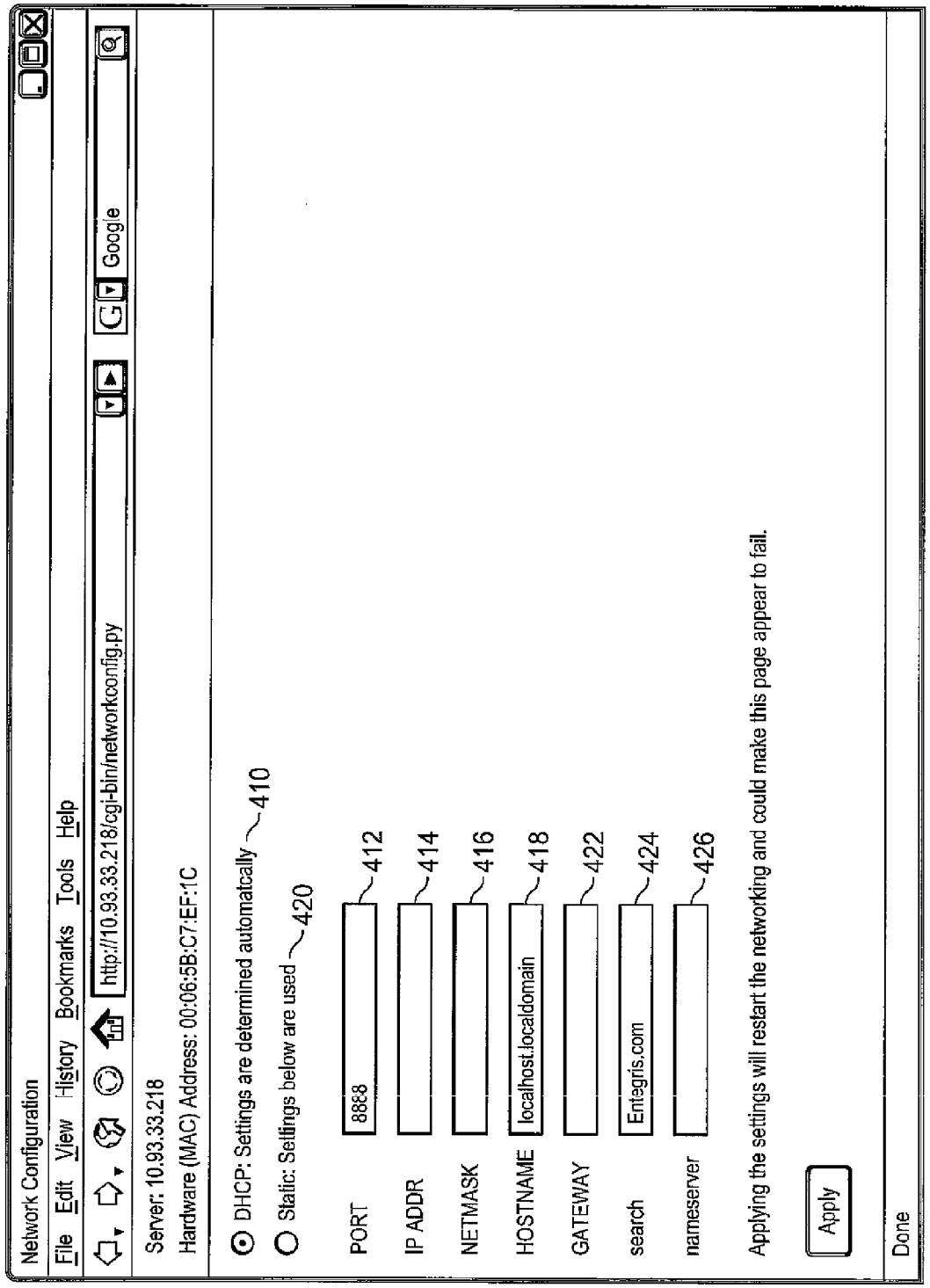
FIG. 4 depicts a screenshot of one embodiment of a network setup application.

Embodiments and the various features and advantageous details thereof are explained more fully with reference to the non-limiting examples that are illustrated in the accompanying drawings and detailed in the following description. Descriptions of well known starting materials, processing techniques, components and equipment are omitted so as not to unnecessarily obscure the disclosure in detail. Skilled artisans should understand, however, that the detailed description and the specific examples, while disclosing preferred embodiments, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited to only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In semiconductor manufacturing, various fluid components may be used to mix chemicals as well as dispensing the mixture of chemicals onto wafers. Examples of components may include, but are not limited to, pumps, valves, heaters, heat exchangers, tanks, filters and sensors. High performance pumps, such as the Entegris IntelliGen Mini photolithography rolling edge diaphragm pump, can be used to mix and dispense the chemicals directly (Entegris and IntelliGen are trademarks of Entegris, Inc. of Chaska, Minn.). U.S. patent application Ser. Nos. 11/051,576, 11/602,472, 11/054,467, 11/229,912, 10/915,853, 11/502,048, 11/659,710, 11/666, 124, 10/521,697, 11/292,559, 11/364,286, 60/861,856, 11/365,395, 11/386,427, 11/273,091, 11/602,464, 11/602, 465, 11/602,485, 11/602,513, 11/602,457, 11/602,507, 11/602,508, 11/602,449, 11/353,294, 11/502,729, and 11/452,754 describe pumps that network interface device 70 may communicate with remotely and hereby fully incorporated by reference herein. For example, the IntelliGen Mini pump can provide data about the mix and dispense operations, as well as other operations (including idle time). In the case of IntelliGen Mini, data can be gathered during operation of the pump. Examples of data that may be gathered from a pump include a time stamp, a cycle number, the total number of cycles, a volume capacity, a volume contained in the pump, an intake rate, a discharge rate, a maximum intake rate, a maximum discharge rate or other data that can be provided by the pump controller. The collected data can be useful for different purposes, such as detecting errors, analyzing system performance, improving processes, detecting pump failures and predicting pump maintenance cycles.

Factory pump interface devices commonly found in manufacturing systems may not have any remote access or database capability, or access may be limited to an MMI. In the case of semiconductor manufacturing, the inability to remotely monitor a pump in the manufacturing process means that a person needing access to the system would need to suit up and enter a clean room. In contrast, embodiments disclosed herein allow users to access the pumps in the manufacturing system remotely, which may be from just outside the clean room to a room thousands of miles away. By connecting the system to a public network such as the Internet, access may be possible from other buildings, departments, etc. For example, maintenance personnel located in one building may periodically access pumps in another building. The maintenance personnel may access a pump to determine the maintenance history of the pump, information about the number of cycles performed by the pump, or other information. The information may be used by the maintenance personnel to prioritize work, may provide information on what tools or parts the maintenance crew needs to bring, may provide information on nearby components so that the maintenance crew can perform preventative maintenance on machines in proximity to an area being serviced, etc.

Some embodiments allow information for a given pump to be automatically pushed or pulled to a database or factory automation system. Factory automation systems use databases to monitor workflow of manufacturing robots, which allows a remote user to interface with factory automation (FA) systems without special software or configuring servers for each customer. Embodiments disclosed herein may integrate with customer factory automation (FA). Various embodiments described herein provide a remote network interface device for a pump according to the pump control protocol and provide data to a database according to the query protocol of the database. This can allow unattended polling of the pump and integration of pump data into a database. Data can be provided to the database as a push initiated by the network interface device or as a pull in response to a command. Embodiments disclosed herein can further provide a modular development platform, which may be useful for lab applications or special customer applications and provides a layer of abstraction, which allows for industry standard integration by allowing a user to communicate with other equipment, components, and products involved in the semiconductor manufacturing process without needing to reconfigure them.

Embodiments disclosed herein provide a general solution with a network interface device, eliminating or reducing the need for customer solutions. In one embodiment, the network interface device links a high performance pump or pump system, such as the IntelliGen Mini pump system, to a computer, which may be networked via a database server residing on a closed or public computer network. Access may be through a web-based application which allows users to login to the network interface device with a username and password. Users may interact with the network interface device directly, such as to check the state of a pump, or may send commands using a database server language such that information is automatically pushed or pulled to a database.

Embodiments of the systems and methods of the present invention may be better explained with reference to FIG. 1, which depicts one embodiment of pump-computer network interface device 70 coupled to network 50 and further connected to pumps 75 in manufacturing system 100. In some embodiments, other embodiments of device 70 may be connected to network 50. Device 70 may be an embedded server. Remote user 150 connected to network 50 may send a command to network interface device located in manufacturing system 100. Commands sent by remote user 150 may provide direct communication with pump 75. For example, a command sent by remote user 150 may turn on pump 75, request the state of pump 75, turn off pump 75, etc. Commands sent by remote user 150 may include instructions to send data for each pump 75 daily, to note when pump 75 started a given process, etc. A database server 155 can maintain a database of information relevant to manufacturing system 100.

In some embodiments, network interface device 70 may be used to communicate with pumps 75 during a process to control characteristics of the fluid flow, temperature and composition. In one embodiment, network interface device 70 is operable to provide remote network-based access to the IntelliGen Mini pump system or other pump systems and products. In one embodiment, a user 150 with access to network 50 can access network interface device 70 and obtain specialized information about pumps 75 or how system 100 is performing from a remote location. Information may be "pushed" by network interface device 70 or may be "pulled" by servers coupled to network interface device 70. Information may include, but is not limited to, information about each dispense cycle, cycle number, pump name or other identifier, timestamp, recipe number, recipe volume, dispense confirmation score, and dispense profile. Alarms, warnings and notifications are some examples of information that may be pushed from pumps 75 to network interface device 70. Information may be pushed to a user 150 via email or instant messaging. For example, information indicating that pump 75 did not discharge a selected volume of fluid may be sent via instant messaging to remote user 150. In some embodiments, network interface device 70 may be configured to send selected information via a first communication and send other selected information via a second communication. Information may be pulled by user 150 accessing one or more web applications. In some embodiments, remote user 150 may log on and communicate with network interface device 70 using and navigating through web pages.

In operation, network interface device 70 can query pump(s) 75 according to the command protocols used by pump 75. In some cases, network interface device 70 may receive a communication over network 50 from remote user 150 or database server 155. The communication may contain a command or a query. For example, a command may include instructions to dispense fluid from pump 75 and a query may include instructions to determine how much fluid volume is in pump 75. The command may be supported by a protocol associated with pump(s) 75, or may be supported by some other protocol. In other cases, network interface device 70 can request data from pump(s) 75 according to the command protocol(s) used by pump(s) 75 and push the data to user 150 or database server 155. In the example of pushing data to database server 155, network interface device 70 can be configured to push the data using the query language supported by database server 155, including, but not limited to, SQL, QL, CQL, CODASYL, D, ISBL, OQL, QUEL, or other query languages. Consequently, network interface device 70 can automatically collect data from pump(s) 75 and populate a remote database.

In some embodiments, remote user 150 may use network interface device 70 to send commands directly to pump 75 and receive responses directly from pump 75. FIG. 2 depicts a flow chart of one embodiment of a method for using network interface device 70 to communicate directly with pump 75, using the protocol for pump 75. Thus, remote user 150 may use a computer operable to prepare commands according to the pump protocol In step 210, a command using an appropriate protocol for pump 75 may be generated by remote user 150 and sent to network interface device 70 using an appropriate network protocol. Internet Protocol version 4 (IPv4) is one example of a network protocol that may be used to send the command from remote user 150 to network interface device 70.

In step 220, network interface device 70 may receive the command and forward the command to pump 75 using an appropriate transport protocol. Thus, if the command was sent by user 150 utilizing an internet protocol, the data may be extracted, unwrapped, or otherwise separated from the various layers of the internet protocol and forwarded using a protocol associated with manufacturing system 100. In some embodiments, a serial transport protocol may be used to forward the command to pump 75 according to one embodiment. In some embodiments, network interface device 70 may send a command or query at a selected time, over a time interval, a select number of iterations, to selected pumps 75, or some other criteria. For example, remote user 150 may send a command to receive information at certain intervals in the process. Network interface device 70 may construct MMI commands and send the commands at the same time each time the process is happening. The information may be helpful for analyzing the manufacturing process because the information is recorded at the same time for each process. Similarly, network interface device 70 may be operable to execute a set of computer-executable instructions at selected intervals to communicate with pumps 75 to fill, mix, dispense or otherwise process fluids in the system 100.

In step 230, pump 75 may receive the command and respond to the command. A command may be a request for information on the state of pump 75, and pump 75 may respond by providing information on the state of pump 75. A command may be a request to turn pump 75 off, and pump 75 may respond by turning off. Other commands may include changing the pump parameters such as discharge rate, intake rate, venting gases, changing the volume drawn in or expelled from pump 75, and the like.

FIG. 3 depicts one embodiment of a method for using network interface device 70 to communicate directly with pump 75 by translating a command into a pump protocol command.

In step 310, a command using a first protocol may be generated by remote user 150 and sent to network interface device 70 using an appropriate network protocol. Internet Protocol version 4 (IPv4) is one example of a network protocol that may be used to send the command from remote user 150 to network interface device 70.

In step 320, network interface device 70 may receive the command, translate the command into an appropriate MMI protocol for pump 75 and forward the command to pump 75 using the appropriate transport protocol. Thus, if the command was sent by user 150 utilizing an internet protocol, the data may be extracted, unwrapped, or otherwise separated from the various layers of the internet protocol. The data may then be used by network interface device 70 to generate one or more commands in the pump command protocol and forward to pump 75 using the appropriate transport protocol.

In step 330, pump 75 may receive the command and respond to the command. As described above, a command may be a request for information on the state of pump 75, and pump 75 may respond by providing information on the state of pump 75. A command may be a request to turn pump 75 off, and pump 75 may respond by turning off. Other commands may include changing the pump parameters such as discharge rate, intake rate, venting gases, changing the volume drawn in or expelled from pump 75, configuring when data is sent to database server 155, and the like.

FIGS. 4-9 depict screenshots of embodiments of graphical user interfaces ("GUIs"). Remote users 150 may use GUIs to interact with network interface device 70 via text, graphical icons, visual indicators, windows and text boxes. FIG. 4 depicts a screenshot of one embodiment of a network setup application GUI, in which a user may opt to automatically determine settings, such as by selecting Dynamic Host Configuration Protocol (DHCP) 410, or may opt to manually determine static network settings 420 by designating port 412, IP address 414, Net Mask 416, Hostname 418 or Gateway 422. The GUI may allow a user to search for an identifier (such as Entegris.com) 424 or for a nameserver 426 that can map an identifier to a computer-recognizable identifier.

Figure 5:
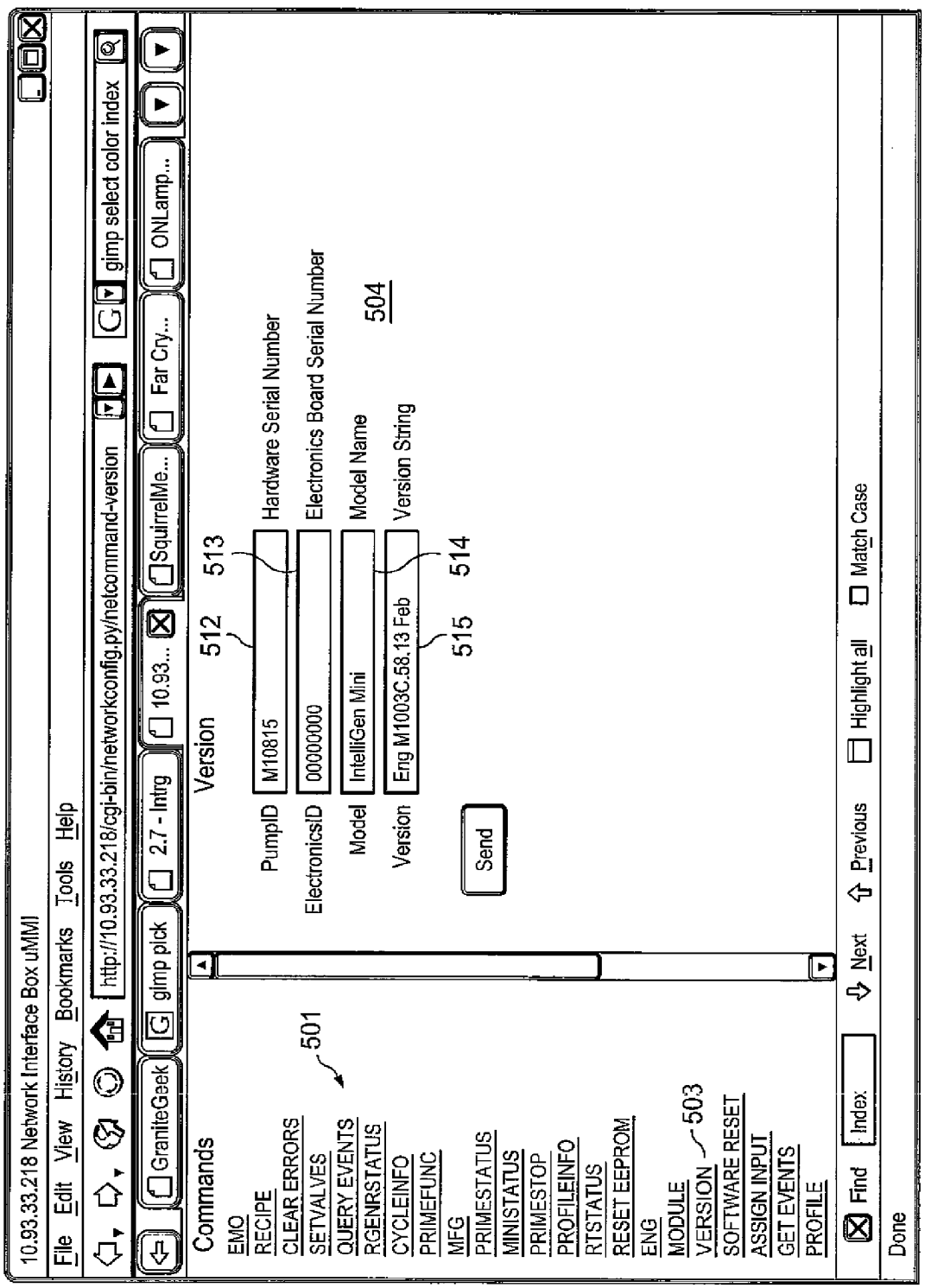
FIG. 5 depicts a screenshot of one embodiment of a simple network MMI.

FIG. 5 depicts a screenshot of one embodiment of a simple network MMI. In some embodiments, a GUI may have a menu 501 with text. Each text may have an associated link. For example, by selecting (i.e., "clicking on") the text "Version" 503 in menu 501, a corresponding GUI appears in window 504 of the GUI. The GUI in window 504 may include text boxes 512, 513, 514 and 515, or may have other drop-down boxes, windows, or the like (not shown). As shown in FIG. 5, text box 512 allows a user to enter a Pump ID or Hardware Serial Number, text box 514 allows a user to designate an Electronics ID or Electronics Board Serial Number, text box 516 allows a user to designate a Model or Model Name, and text box 515 allows a user to designate a version or version string. Other names, numbers, or other identifiers are also possible.

Figure 6:
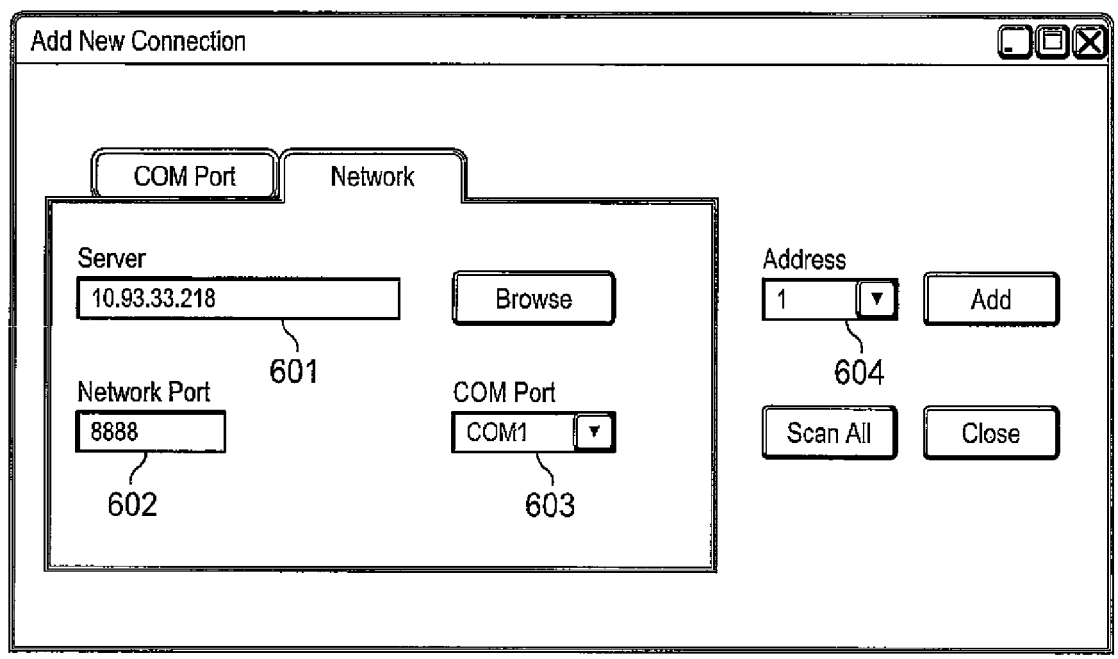
FIG. 6 depicts a screenshot of one embodiment for selecting a remote pump.

FIG. 6 depicts a screenshot of a GUI illustrating one embodiment for selecting a remote pump. In some embodiments, a user may designate an address for network interface device 70 by manually entering the information such as by entering text in text box 601, or may browse the network to locate the network interface device 70. In some embodiments, information may be manually entered, such as network port (i.e., 8888) in text box 602. In some embodiments, a GUI may allow slecting information from a drop-down menu, such as for selecting a communications port (i.e., COM1) from drop-down box 603. Similarly, an address may be selected from drop-down menu 604. Thus, a pump may be added to system 100 for communication with network interface device 70.

Figure 7:
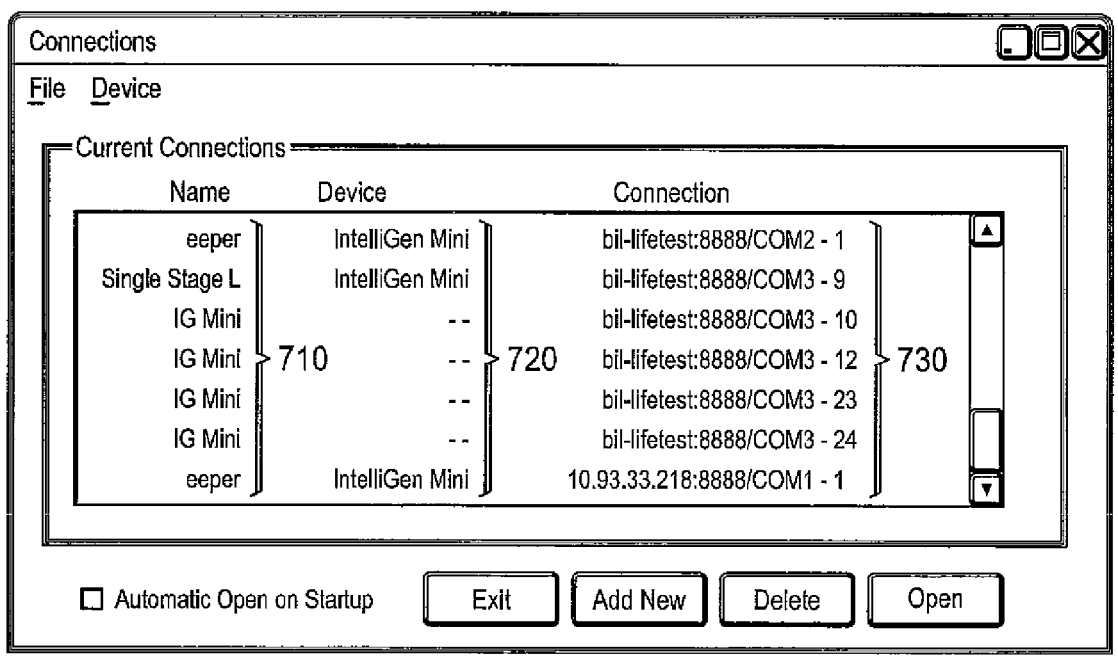
FIG. 7 depicts a screenshot of one embodiment of a GUI displaying remote MMI connections for a manufacturing system.

FIG. 7 depicts a screenshot of one embodiment of a GUI displaying current remote MMI connections for system 100. The GUI may display names 710 of each component 720 and connections 730. Thus, a user may see that an Intelligen Mini pump 720 with the name "Single Stage L" may be communicated to using connection "bil-lifetest:8888/COM3-9".

Figure 8:
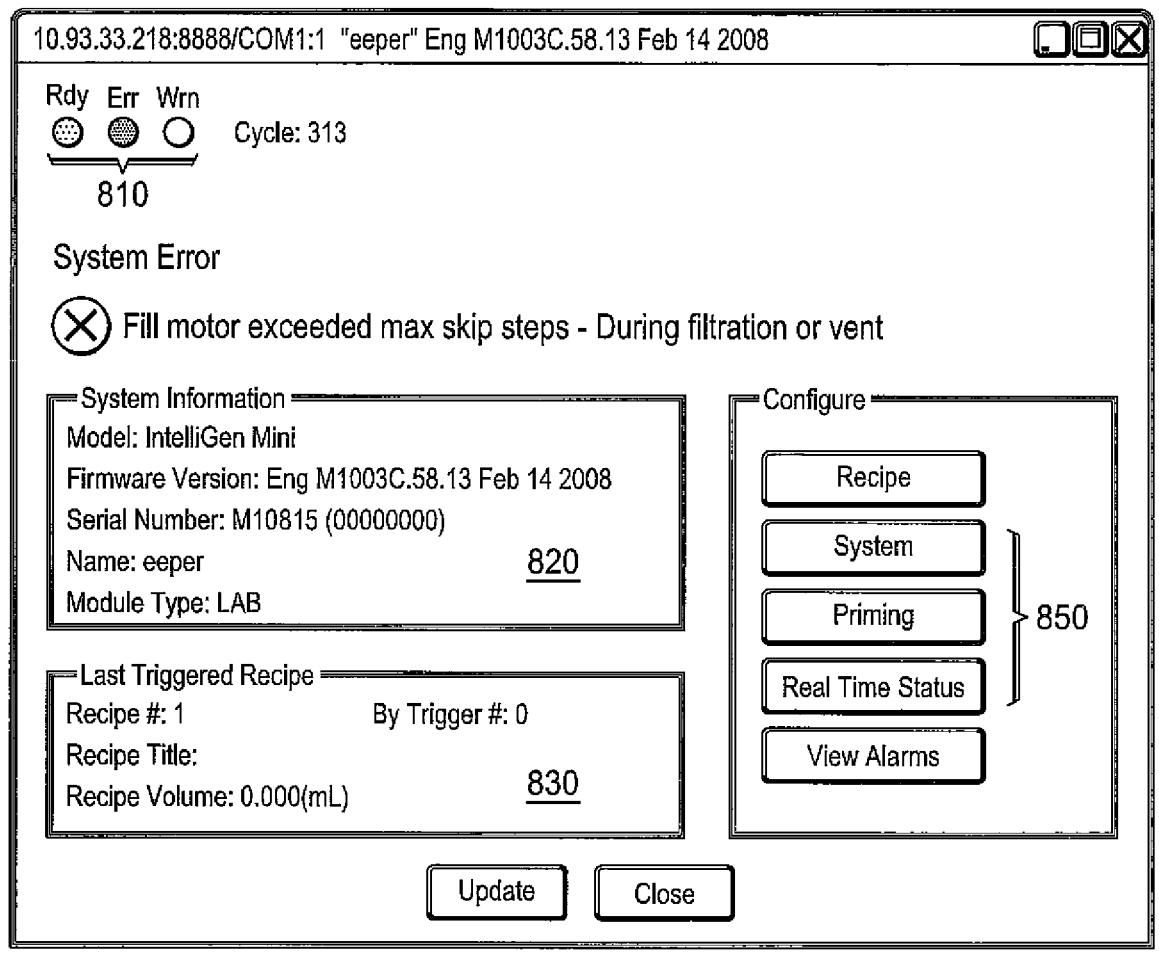
FIG. 8 depicts a screenshot of one embodiment of a remote pump status screen.

FIG. 8 depicts a screenshot of one embodiment of a remote pump status GUI. In some embodiments, a GUI such as shown in the screenshot of FIG. 8 may be sent to remote user 150 (such as by email) or may be displayed for access by users 150. Embodiments may display error codes 810, text boxes 820 and 830, and may contain buttons 850, widgets or other graphical elements that allow users to directly manipulate the GUI to communicate with system 100. Error codes 810 may provide a quick visual indication of the status of the system or components of the system. Text boxes 820 and 830 may provide information relating to system information, recipe information, performance, or the like. Buttons 850 may allow a user to configure a recipe or the system, prime pumps 75, see real-time status, view alarms, etc.

Access to any GUI (also referred to as a "page") may be limited to prevent undesirable modification of a system. A main page may be accessed to navigate through other pages.

A main page may be accessed to view a list of all pumps 75 and information about the state of each pump.

A pump page may be accessed to view information about a selected pump 75. Information may include the name, port/address, status and alarm state. In some embodiments, users 150 may access pump 75 from a main page and set up pump 75, monitor pump 75 during a process, change the paramters of pump 75, and actuate pump 75. As an example, embodiments disclosed herein allow users 150 to select a pump 75 to program a recipe, view the system in which pump 75 operates and prime pump 75.

A recipe page may be used to communicate information about the processes involved in a process. The user 150 may view information about the processes involved, and may program a recipe to specify the volumes of each chemical involved in the process, when the chemical should be drawn into each pump, and when each chemical should be discharged from each pump. The recipe may include mixing chemicals to make other chemicals, mixing different concentrations of the same chemical to make other concentrations, mixing chemicals with different temperatures to add or extract heat from the chemicals, and venting gases from the fluids. The recipe page may also allow for manual operation, and may include an option to dispense the chemicals.

Figure 9:
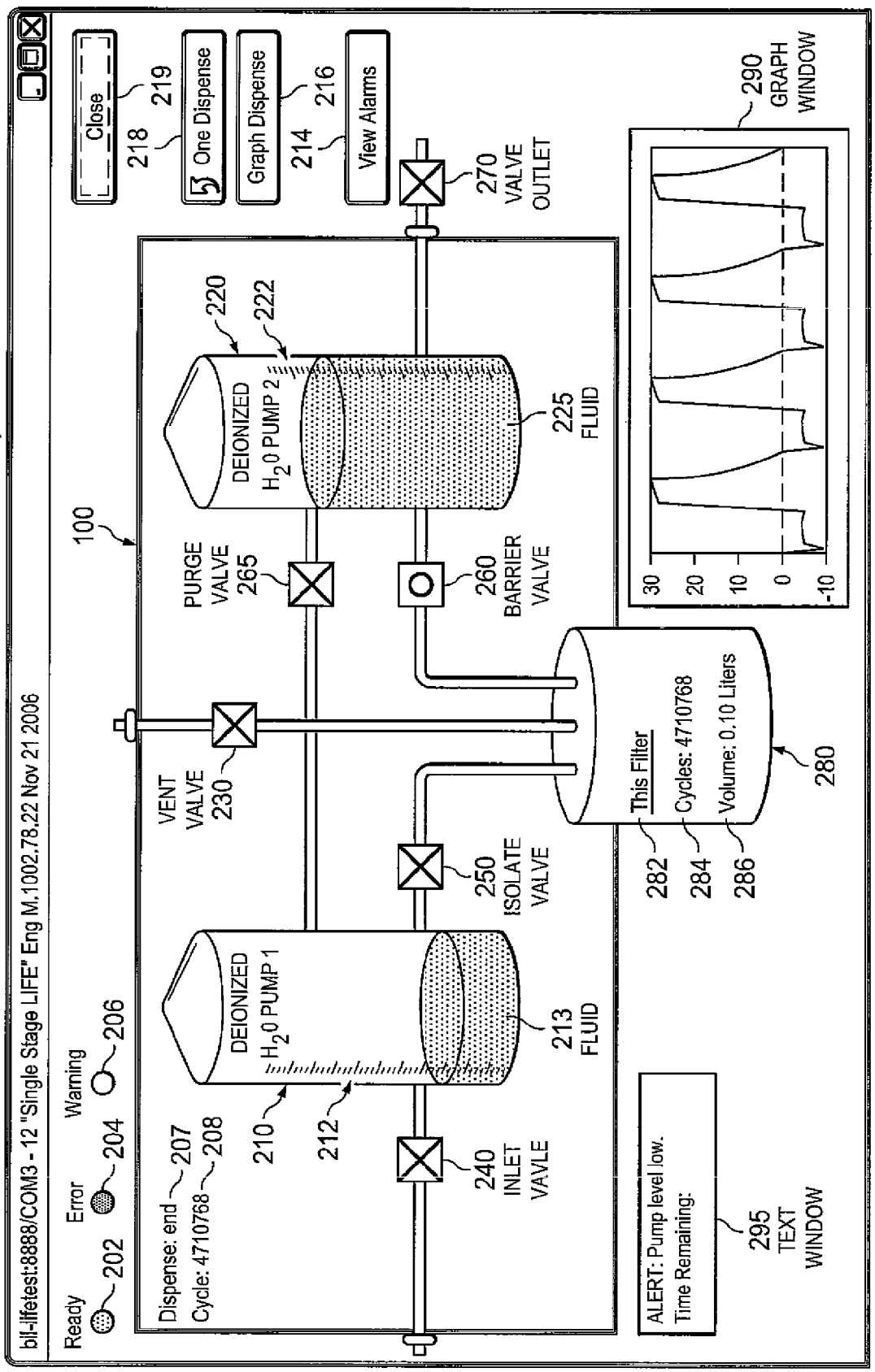
FIG. 9 depicts a screenshot of one embodiment of a remote pump real time display.

A system page may be accessed to communicate information about a system and may include information about system parameters and provide functionality to allow user 150 to reset codes, clear information, etc. FIG. 9 depicts a screenshot of one embodiment of a remote pump real time display. FIG. 9 depicts a screenshot of one embodiment of computer interface 100 that allows a user to see the operation of a pump in real time display and interactively communicate with pumps from a remote location. System page 201 depicts pump 210 having fluid 213, which may have a volume indicated by increments 212. Fluid entering system 100 of a manufacturing process may enter system 100 via inlet valve 240. In FIG. 9, inlet 240 is depicted as closed by an "X" in box 240 (i.e., no fluid may enter system 100). Fluid may be discharged by pump 210 and pass through isolation valve 250 and enter filter 280. Isolation valve 250 is also depicted as closed with an "X". Filter 280 depicts an alternative way to represent the fluid level. Instead of using increments (such as increments 212 on pump 210), the volume in filter 280 may be represented with text 286 (i.e. 0.10 Liters). Filter 280 may have other information, such as name 282, number of cycles 284 or some other information. Fluid may leave filter 280 either through vent valve 230 or through barrier 260 to tank 220. As depicted in system page 201, vent valve 230 is closed and barrier 260 is depicted as open with a circle in box 260. The volume of pump 220 is depicted in a similar manner as pump 210, such that the level of fluid 223 may be indicated by reading increments 222. Fluid may be discharged from pump 220 and exit system 100 via outlet 270, which is indicated as closed on system page 201. System page 201 depicts other information which may be useful for a remote user. Ready indicator 202, error indicator 204 and warning indicator 206 may provide information on the status of system 100 such that a user can tell the status of system 100. In some embodiments, if error indicator 204 or warning indicator 206 are activated, additional information may be provided, which may include text in window 295 or graphical representation in window 290. System 100 may provide options 214, 216, 218 or 219 to allow a user to view related information. Option 214 may allow a user to view past alarms or otherwise review the history of system 100. Option 216 may allow a user to graph a dispense profile or other process associated with system 100. Option 218 may allow a user to navigate through system 100, such as to test system 100. Option 219 may allow a user to return to a home page or otherwise navigate to other high-level options. Thus, embodiments disclosed herein may enable remote users 150 to communicate with components of system 100 for status or other information, may communicate with components to set up, modify or delete recipes or other processes, and to test or calibrate components in system 100.

A priming page can provide the status of a priming operation and may further allow modification of the priming operation. A priming operation may be initiated from a priming page.

In addition to allowing user 50 to access pump 75 directly, network interface device 70 may push different types of data to a remote database server that may be accessed by user 50. Various types of data may be included in data pushed by pump 75 to network interface device 70. Timestamp may be any data that allows user 50 to know when the information was recorded or pushed to database server 155. Cycle, Name, Event Code, Event Text, and Trigger may include data to indicate when information about pump 75 should be polled. For example, a user may set an event code such that whenever pump 75 discharges more than 0.10 Liters, information about the performance of pump 75 is polled. A trigger may be enabled so that predefined data may be sent to network interface device 70. Triggers may include, but are not limited to, cycle count increments, recent log event increments, powerup event, reset event, priming event, warning event and error alarm. For example, on every dispense cycle network interface device 70 may notice the cycle counter changed and prompt pump 75 for information such as a timestamp, the cycle number, the recipe and the recipe volume. Multiple triggers may be established through a page provided by network interface device 70 and saved in non-volatile storage.

The terms Recipe, Recipe Name, Recipe Volume, Max Dispense Pressure, DC Value, and Dispense Profile may generally refer to information about the performance of pump 75. For example, by comparing the dispense profile and maximum dispense pressure to what was programmed for the recipe, a user may determine that pump 75 needs calibration.

The terms Serial Number, Model, Firmware Version, Total Volume, Filter Volume, Filter Cycles and Priming Sequence may generally refer to information about pump 75. For example, the serial number and model number may be used for comparing pumps 75 against other pumps manufactured about the same time to estimate an expected life for pump 75.

In unattended modes, network interface device 70 may poll pump 75 to get information on the performance of pump 75. The information may include a time stamp. If the time stamp has not changed, other information may not be needed. If the time stamp has changed, other information such as the recipe, the cycle that pump 75 is on, and the recipe volume may be sent to network interface device 70.

Figure 10:
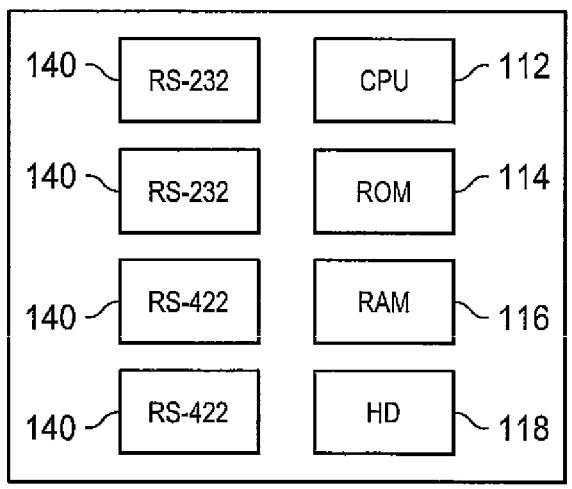
FIG. 10 is a diagrammatic representation of a hardware configuration of one embodiment of an interface.

Network interface device 70 can generate or forward commands to pump 75 to retrieve information from pump 75 and format the information according to an appropriate query language to populate a database. FIG. 10 depicts an exemplary file containing code for forwarding data to a database server and other options. In this embodiment, the database server may be a SQL server.

FIG. 10 depicts an illustration of a hardware configuration of one embodiment of a network interface device 70. Network interface device 70 may include a central processing unit ("CPU") 112, read-only memory ("ROM") 114, random-access memory ("RAM") 116, and hard drive memory ("HD") 118. In one embodiment, network interface device 100 comprises at least one non-volatile memory, such as flash memory, read-only memory, etc. for storing a set of instructions and at least one processor for executing them.

Network interface device 70 may include one or more communication port(s) 140 for communicating with pumps 75 in the system being monitored or for interfacing with network 50. Network interface device 70 may include communication ports 140 for communicating with pumps or other devices in a manufacturing process. Communication ports 140 may be RS-232 and RS-422 ports or some other serial or parallel communications ports. Communication port 140 can be a network communication port, such as an Ethernet interface, or other network communication port. In one embodiment, network interface device 70 may comprise additional ports such as a parallel port or a universal serial bus port, processors, or data storage devices.

Figure 11:
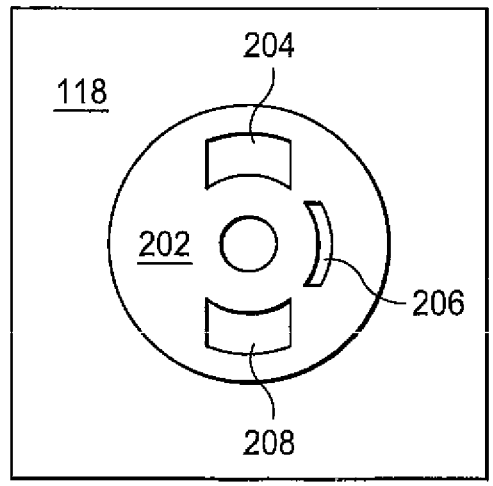
FIG. 11 is a diagrammatic representation of a computer medium including software code having instructions in accordance with one embodiment.

Portions of the methods described herein may be implemented in suitable software code that may reside within ROM 114, RAM 116 or HD 118. The instructions in may be contained on a data storage device, such as HD 118. FIG. 11 illustrates a combination of software code elements 204, 206, and 208 that are embodied within data processing system readable medium 202 on HD 118. Alternatively, the instructions may be stored as software code elements on a DASD array, magnetic tape, floppy diskette, optical storage device, or other appropriate data processing system readable medium or storage device.

In an illustrative embodiment of the invention, the computer-executable instructions may be lines of compiled $C^{++}$, Java, or other language code. FIG. 12 depicts a file having code for forwarding data to a database server using a database language. Other architectures may be used. For example, the functions of any one of the computers may be performed by a different computer shown in FIG. 10. Additionally, a computer program or its software components with such code may be embodied in more than one data processing system readable medium in more than one computer.

In various hardware configurations, the various software components may reside on a single server computer or on any combination of separate server computers. In alternative embodiments, some or all of the software components may reside on the same server computer.

In the foregoing specification, the invention has been described with reference to specific embodiments. However, one of ordinary skill in the art can appreciate that various modifications and changes can be made without departing from the spirit and scope of the invention. Accordingly, the specification and figures disclosed herein, including the appendices, are to be regarded in an illustrative rather than a restrictive sense, and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A network interface device comprising:
   one or more pump communication ports;
   at least one computer network communication port;
   a non-volatile computer memory for storing a set of computer-executable instructions; and
   a processor for executing the set of computer-executable instructions operable to:
   communicate with one or more pump controllers coupled to the network interface device using a command protocol supported by the one or more pump controllers via the one or more pump communication ports, wherein interacting with the one or more pump controllers includes obtaining information about one or more pumps coupled to the one or more pump controllers;
   translate the information received from the one or more pump controllers into a query language supported by a database server;
   communicate with the database server, which is external to the network interface device and is coupled to the network interface device via the at least one computer network communication port, wherein interacting with the database server includes forwarding the information received from the one or more pump controllers to the database server according to a the query language supported by the database server; and
   initiate a push of the information received from the one or more pump controllers to the database server.

2. The network interface device of claim 1, wherein the one or more pump communication ports comprise at least one serial port.

3. The network interface device of claim 1, wherein the at least one computer network communication port comprises an Ethernet port.

4. The network interface device of claim 1, further comprising a wireless network interface.

5. The network interface device of claim 1, wherein the set of instructions is further operable to provide remote access to the one or more pump controllers.

6. The network interface device of claim 5, wherein the remote access is obtainable via a Web browser application running on a client machine coupled to the network interface device via the at least one computer network communication port.

7. The network interface device of claim 1, wherein the information about the one or more pumps includes one or more of cycle number, device identifier, time stamp, recipe number, recipe volume, dispense confirmation score, dispense profile, or a combination thereof.

8. The network interface device of claim 1, wherein the network interface device is operable to communicate with the one or more pump controllers to configure the one or more pump controllers.

9. The network interface device of claim 1, wherein the network interface device is further operable to provide an alarm, an error message, a notification, or a combination thereof to a user device communicatively coupled to the network interface device.

10. The network interface device of claim 1, wherein the database server is a part of a factory automation system and wherein the network interface device is further operable to provide an alarm, an error message, a notification, or a combination thereof to the factory automation system.

11. The network interface device of claim 1, wherein the network interface device is operable to interact with the database server in Structured Query Language (SQL).

12. The network interface device of claim 1, wherein the network interface device is operable to support HyperText Transfer Protocol (HTTP) and Dynamic Host Configuration Protocol (DHCP).

13. The network interface device of claim 1, wherein the set of computer-executable instructions is further operable to communicate with the one or more pump controllers coupled to the network interface device using at least two different command protocols, wherein each of the command protocols is supported by at least one of the one or more pump controllers.

* * * * *

UNITED STATES PATENT AND TRADEMARK OFFICE
CERTIFICATE OF CORRECTION

| | |
|---|---|
| PATENT NO. | : 7,941,565 B2 |
| APPLICATION NO. | : 12/114414 |
| DATED | : May 10, 2011 |
| INVENTOR(S) | : Johnathan Owen Vail |

It is certified that error appears in the above-identified patent and that said Letters Patent is hereby corrected as shown below:

Col. 12, line 13, replace "a the query language" with -- the query language --

Signed and Sealed this
Twenty-fifth Day of December, 2012

David J. Kappos
*Director of the United States Patent and Trademark Office*